UNITED STATES PATENT OFFICE.

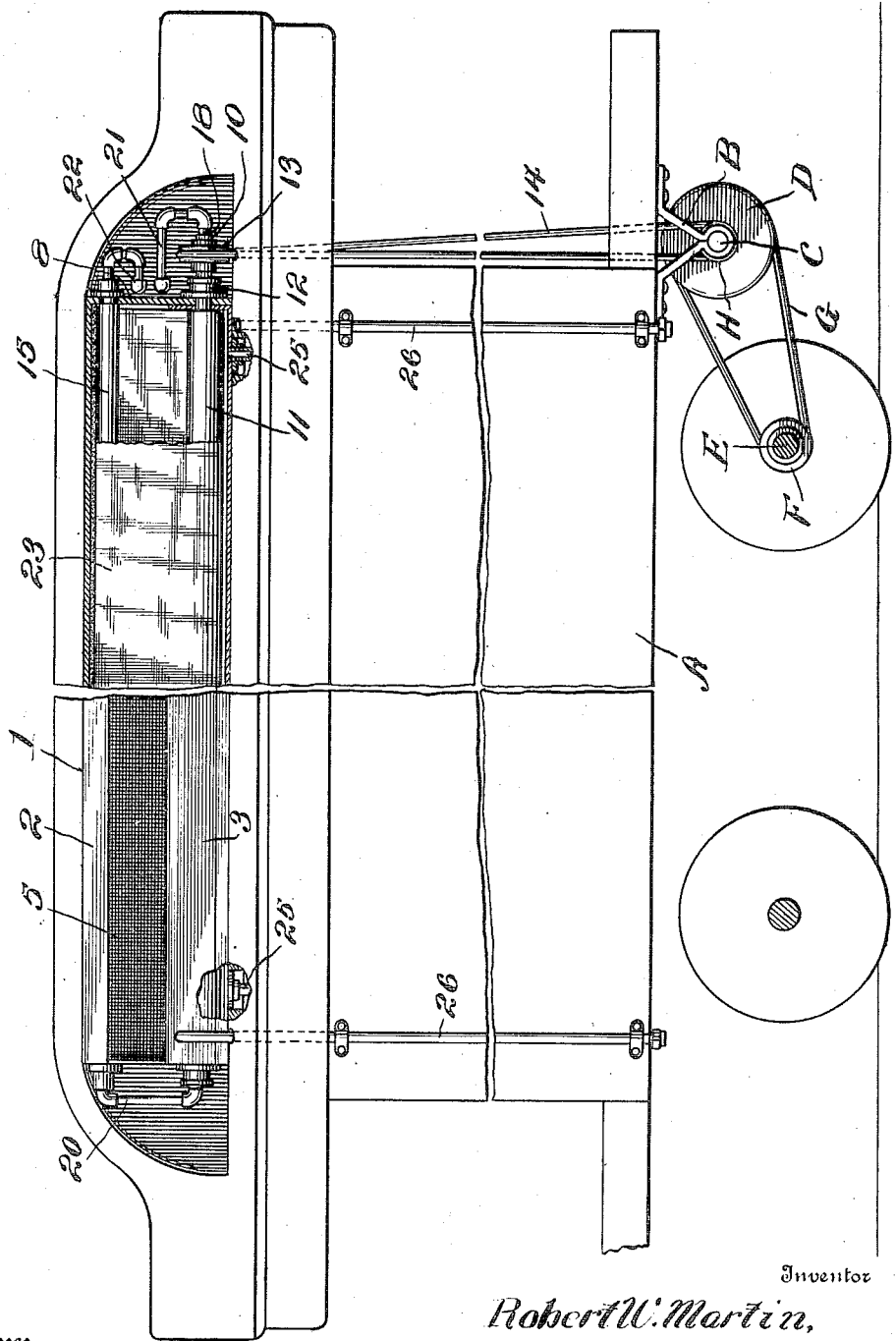

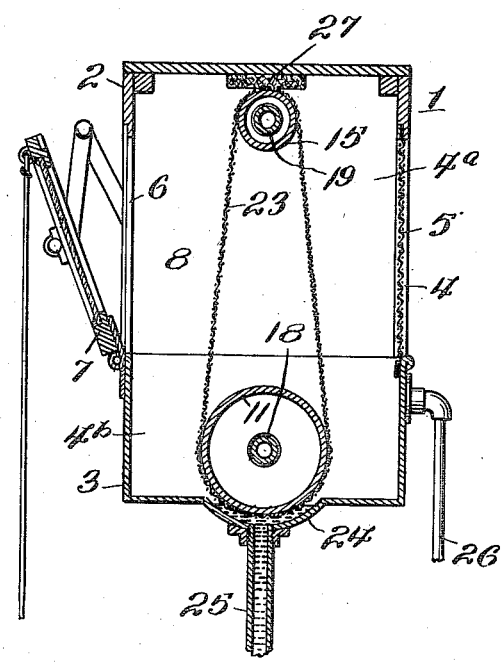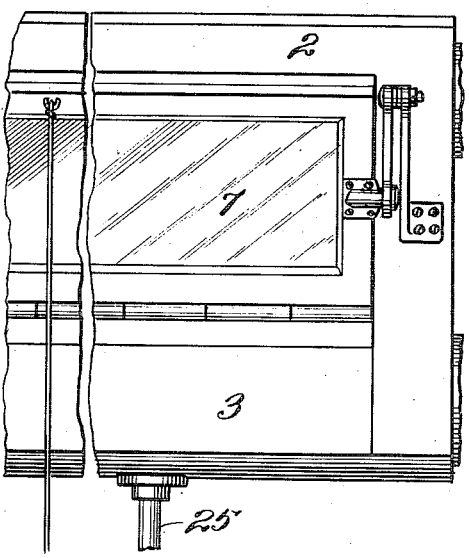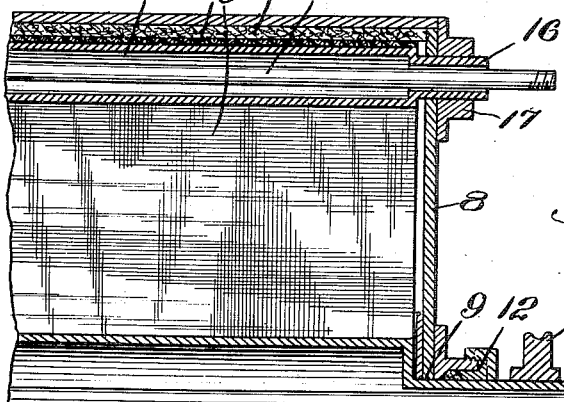

ROBERT W. MARTIN, OF BUHL, MINNESOTA.

VENTILATOR.

972,005.

Specification of Letters Patent.

Patented Oct. 4, 1910.

Application filed January 5, 1909. Serial No. 470,750.

*To all whom it may concern:*

Be it known that I, ROBERT W. MARTIN, a citizen of the United States, residing at Buhl, in the county of St. Louis and State of Minnesota, have invented new and useful Improvements in Ventilators, of which the following is a specification.

This invention relates to ventilators, particularly adapted for use in connection with railway cars of the passenger type, and has for an object to provide a ventilator in which means will be employed for collecting foreign matter, and for delivering at all times into a car purified air.

A further object of my invention is to provide a ventilator adapted to contain a quantity of water or liquid to saturate an endless porous or fabric belt arranged in the ventilator to separate the air inlet from the air discharge, so that gaseous odors from the inlet may be caught or arrested by the belt to obviate the entrance of said gaseous odors and will be excluded from the car, said belt as before stated also serving to arrest all foreign matter.

A still further object of my invention is to provide hollow rollers for the endless belt, a trough or water receptacle for moistening the belt, and to further provide means for heating the rollers to prevent, in cold weather freezing of the belt or the water in the trough, thus effecting at all times a perfect operation.

Other objects and advantages will be apparent as the nature of the invention is better set forth, and it will be understood that changes within the scope of the claims may be resorted to without departing from the spirit of the invention.

In the drawings, forming a portion of this specification and in which like numerals of reference indicate similar parts in the several views:—Figure 1 is a diagrammatic view showing a car having my improved ventilator applied thereto, parts of the ventilator being shown in section. Fig. 2 is an enlarged vertical section through the ventilator. Fig. 3 is a side view looking toward the side of the ventilator. Fig. 4 is a detail longitudinal section through a portion of the ventilator.

Referring now more particularly to the drawings, there is shown in diagram in Fig. 1 a car A which is provided with a bracket B for supporting an axle C upon which is mounted a pulley D. One axle E of the car A carries a pulley F, and this pulley and the pulley D receive an endless belt G. The axle C is also provided with a pulley H for a purpose to be hereinafter more fully described. When the car A is in motion, it is obvious that power derived by the axle E will be utilized to drive the axle C.

The ventilator is shown at 1 and comprises an elongated hollow body having an upper portion 2 which is preferably constructed of wood or the like and a lower portion 3 which I preferably construct of copper, but as will be readily appreciated I do desire to limit myself to the sole use of copper but desire the privilege to use any such metal that will afford a water proof structure. The portion 2 of the ventilator is provided upon the outer side thereof with an opening 4 in its side wall, and this opening is covered with foraminous material 5. The opening 4 will be hereinafter referred to as an inlet, and the inner wall of the portion 2 is provided with what may be termed a discharge opening 6 arranged to be closed by a hinged door 7.

The end walls 8 of the ventilator have formed therein adjacent to their lower ends alining passages 9 which receive the hollow journal members 10 at the ends of a hollow roller 11. The hollow journals 10 are passed through suitable stuffing boxes 12 at the ends of the ventilator as clearly shown in Fig. 4 of the drawings. One of the hollow journals 10 carries a pulley 13, and connected with this pulley, and with the pulley H upon the axle C is a belt 14. A roller 15 of hollow form is located adjacent to the upper end of the ventilator and is also provided with hollow journals 16 at the ends thereof revolubly mounted in bearings 17. A steam pipe 18 is passed through the roller 11 and a similar steam pipe 19 is passed through the roller 15. At one end, the steam pipes 18 and 19 are connected by a pipe 20. At the other end the pipe 18 is connected to a pipe 21 which receives steam or heating fluid from the heating apparatus of a car. From the construction just described it is obvious that the steam or other heating fluid can be effectively carried from the pipe 21 through the pipe 18 to heat the roller 11, and the steam or heating fluid will also be carried from the pipe 20 into the pipe 19 to heat the roller 15, and from the pipe 19 the steam or fluid may be discharged from a pipe 22.

A belt 23 is passed over the rollers 11 and 15, and this belt is formed of porous or fabric material preferably so that it will absorb moisture.

The bottom of the portion 3 of the ventilator is constructed so that it forms a longitudinally extending trough or receptacle 24 in which is disposed a portion of the roller 11 as clearly shown in Fig. 2 of the drawings. The trough 24 receives at its bottom the upper ends of drain and flushing pipes 25 which are provided for flushing the trough or for entirely draining the same of water. The portion 3 of the ventilator is provided at a point above the bottom thereof with a plurality of overflow pipes 26 so that, incident to the movements or vibrations of the car should water escape from the trough it will be discharged from the overflow pipes 26.

By providing the stuffing boxes 12 to receive the journals 10 of the roller 11, it is obvious that it is impossible for water should it be discharged from the trough to leak downwardly from the sides of the ventilator.

Upon the under side of the top of the portion 2, I secure a longitudinally disposed strip of felt 27 to prevent the entrance of foreign matter into the opening 6.

In operation, when the car is in motion, power will be supplied to the axle C to revolve the roller 11 to operate the belt 23 so that it will be effectively saturated at all times in view of the fact that a portion of the roller 11 is disposed in the trough 24. As hereinbefore stated heat is passed through the pipes 18 and 19 so that the rollers 11 and 15 are kept warm at all times to prevent freezing of the belt and the water in the trough 24, thus providing a perfect operation of the belt at all times.

By constructing a ventilator as described in the foregoing, it will be understood that should silt, cinders or any other foreign matter enter the ventilator through the foraminous material 5, such matter will be confined at one side of the belt 23 and effectively held against entering the other side of the ventilator to avoid its passing by way of the passage 6 into the car. By saturating the belt 23 and by arranging the belt so that it divides the ventilator as shown in Fig. 2 of the drawings into what may be termed an inlet compartment $4^a$ and what may be termed a discharge compartment $4^b$ so that air in entering the ventilator will pass through the belt 23 to become filtered and to separate the air from the gases, so that the compartment $4^b$ can at all times contain a quantity of fresh air to be discharged into the car by way of the passage 6.

I claim:

In a ventilator, the combination with a receptacle having a foraminous portion at one side and formed at the other side to provide an opening, a closure for the opening, the said receptacle being formed to provide a substantially trough-like bottom, a water feed connection opening directly into the said trough-like bottom, of superimposed hollow rollers extending the entire length of the receptacle, the lower roller having a portion extending into the trough portion of the bottom of the receptacle to be partly submerged in the liquid therein, a fabric belt extending over the rollers, the said belt being arranged immediately between the opening and the foraminous portion respectively of the said receptacle and dividing the receptacle into separate compartments, heating elements extending through the rollers, and driving mechanism geared to one of the rollers and operating to continuously revolve the belt and to cause the same to be saturated by the liquid in the trough-like bottom of the receptacle.

In testimony whereof I affix my signature in presence of two witnesses.

ROBERT W. MARTIN.

Witnesses:
 RICHARD JOHNSON,
 T. P. CORY.